United States Patent
Brück (10) Patent No.: US 7,128,772 B2
(45) Date of Patent: Oct. 31, 2006

(54) FILTER ASSEMBLY, PROCESS FOR PRODUCING THE FILTER ASSEMBLY AND FILTER BODY HAVING THE FILTER ASSEMBLY

(75) Inventor: Rolf Brück, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 2 days.

(21) Appl. No.: 10/823,986

(22) Filed: Apr. 13, 2004

(65) Prior Publication Data

US 2004/0187456 A1 Sep. 30, 2004

Related U.S. Application Data

(63) Continuation of application No. PCT/EP02/11683, filed on Oct. 18, 2002.

(30) Foreign Application Priority Data

Oct. 29, 2001 (DE) ................................ 101 53 284

(51) Int. Cl.
*B01D 53/36* (2006.01)

(52) U.S. Cl. .................. 55/385.3; 55/487; 55/488; 55/489; 55/486; 55/523; 55/DIG. 30; 96/134; 96/135; 96/154; 60/299; 60/300; 422/177; 422/179; 422/180; 427/376.6; 427/376.7; 210/483; 210/484; 210/488; 210/489; 210/490; 210/491; 210/492

(58) Field of Classification Search .............. 55/385.3, 55/DIG. 30, 486–489, 523; 422/177, 179, 422/180; 60/299, 300; 427/376.6, 376.7; 96/134, 135, 154; 210/483–492

See application file for complete search history.

(56) References Cited

U.S. PATENT DOCUMENTS

| 4,256,700 | A | * | 3/1981 | Smith et al. ................. 422/177 |
| 4,600,420 | A | | 7/1986 | Wydeven et al. |
| 5,273,724 | A | * | 12/1993 | Bos ............................ 422/179 |
| 5,298,046 | A | * | 3/1994 | Peisert ......................... 55/486 |
| 5,322,672 | A | * | 6/1994 | Breuer et al. ................ 422/180 |
| 5,482,681 | A | * | 1/1996 | Sager, Jr. ..................... 422/180 |
| 6,355,078 | B1 | * | 3/2002 | Wickland .................. 55/385.4 |
| 6,413,589 | B1 | * | 7/2002 | Li ............................ 427/376.6 |
| 6,534,021 | B1 | | 3/2003 | Maus |
| 2003/0072694 | A1 | | 4/2003 | Hodgson et al. |

FOREIGN PATENT DOCUMENTS

| DE | 239 125 A1 | 7/1985 |
| DE | 38 01 634 A1 | 8/1989 |
| DE | 197 04 147 A1 | 8/1998 |
| DE | 100 20 170 C1 | 9/2001 |
| EP | 0 717 177 A2 | 6/1996 |
| WO | 91/01178 | 2/1991 |

* cited by examiner

*Primary Examiner*—Duane Smith
*Assistant Examiner*—Minh-Chau T. Pham
(74) *Attorney, Agent, or Firm*—Laurence A. Greenberg; Werner H. Stemer; Ralph E. Locher (57) ABSTRACT

A filter assembly through which a fluid can flow and a method for the production thereof are provided. The filter assembly includes at least one covering layer made of an at least partially porous material with at least one boundary region and includes at least one fiber layer made of a fiber fabric. The at least one covering layer forms a sleeve that encloses the fiber layer so that the fiber layer is permanently disposed inside the at least one covering layer. The filter assembly makes it possible to produce a filter body that can be used, in particular, for cleaning exhaust gases of mobile internal combustion engines.

33 Claims, 4 Drawing Sheets

FILTER ASSEMBLY, PROCESS FOR PRODUCING THE FILTER ASSEMBLY AND FILTER BODY HAVING THE FILTER ASSEMBLY

CROSS-REFERENCE TO RELATED APPLICATION

This application is a continuation, under 35 U.S.C. § 120, of copending International Application No. PCT/EP02/11683, filed Oct. 18, 2002, which designated the United States; this application also claims the priority, under 35 U.S.C. § 119, of German Patent Application 101 53 284.9, filed Oct. 29, 2001; the prior applications are herewith incorporated by reference in their entirety.

BACKGROUND OF THE INVENTION

FIELD OF THE INVENTION

The invention relates to a filter assembly through which a fluid can flow. The invention also relates to a filter body for purifying or cleaning an exhaust-gas stream from an internal combustion engine, which is constructed by using the filter assembly according to the invention. Furthermore, the invention relates to a process for producing a filter assembly.

If new vehicle registrations in Germany are considered, it will be found that in the year 2000 around one third of all newly registered vehicles had diesel engines. By tradition, that percentage is significantly higher than in, for example, France and Austria. That increased interest in diesel vehicles stems, for example, from the relatively low fuel consumption, the currently relatively low prices of diesel fuel, as well as from the improved driving properties of vehicles of that type. A diesel vehicle is also very attractive from environmental aspects, since it has a significantly reduced emission of $CO_2$ compared to gasoline-powered vehicles. However, it should be noted that the level of soot particulates produced during combustion is well above that of gasoline-powered vehicles.

If the purification or cleaning of exhaust gases, in particular of diesel engines, is considered, it is possible for hydrocarbons (HC) and carbon monoxide (CO) in the exhaust gas to be oxidized in a known way by, for example, being brought into contact with a catalytically active surface. However, it is more difficult to reduce nitrogen oxides ($NO_x$) under oxygen-rich conditions. A three-way catalytic converter as is used, for example, in spark-ignition engines, does not provide the desired effects. For that reason, the selective catalytic reduction (SCR) process has been developed. Furthermore, $NO_x$ adsorbers have been tested for use for the reduction of nitrogen oxides.

Discussions have long been ongoing as to whether or not particulates or long-chain hydrocarbons have an adverse effect on human health, but to date no definitive verdict has been reached. Irrespective of that, it is clearly desirable that emissions of that nature should not be released to the environment above a certain tolerance range. In that respect, the question arises as to what filtering efficiency is actually required in order to be able to comply with the well known statutory guidelines even in the future. If current exhaust emissions from commercially available vehicles in the Federal Republic of Germany are considered, it can be concluded that most passenger automobiles certified under EU III in 1999 are also able to satisfy the requirements of EU IV if they are equipped with a filter with an efficiency of at least 30 to 40%.

In order to reduce the levels of particulate emissions, it is known to use particulate traps which are constructed from a ceramic substrate. They have passages, so that the exhaust gas which is to be purified can flow into the particulate trap. The adjacent passages are alternately closed off, so that the exhaust gas enters the passage on the inlet side, passes through the ceramic wall and escapes again through the adjacent passage on the outlet side. Filters of that type achieve an efficiency of approximately 95% over the entire range of particulate sizes which occur.

In addition to chemical interactions with additives and special coatings, the reliable regeneration of the filter in the exhaust system of an automobile still constitutes a problem. It is necessary to regenerate the particulates trap, since the increasing accumulation of particulates in the passage wall through which the gas is to flow leads to a constantly increasing pressure loss which has adverse effects on engine performance. The regeneration substantially includes brief heating of the particulates trap and the particulates which have accumulated therein, so that the soot particulates are converted into gaseous constituents. However, that high thermal loading of the particulates trap has adverse effects on the service life.

In order to avoid that discontinuous regeneration, which is a major factor in promoting thermally induced wear, a system for the continuous regeneration of filters has been developed (CRT: continuous regeneration trap). In a system of that type, the particulates are burnt through the use of oxidation with $NO_2$ at temperatures which are already over 200° C. The $NO_2$ which is required for that purpose is often generated by an oxidation catalytic converter disposed upstream of the particulates trap. However, in particular for use in motor vehicles using diesel fuel, that gives rise to the problem that there is only an insufficient level of nitrogen monoxide (NO) which can be converted into the desired nitrogen dioxide ($NO_2$) in the exhaust gas. Consequently, it has not heretofore been possible to ensure that continuous regeneration of the particulates trap in the exhaust system will occur.

Furthermore, it should be borne in mind that, in addition to non-convertible particulates, oil or additional residues of additives also accumulate in a particulates trap and cannot be readily regenerated. For that reason, known filters have to be replaced and/or washed at regular intervals. Filter systems with a plate-like structure attempt to solve that problem by allowing vibration-like excitation which leads to those constituents being removed from the filter. However, that means that the non-regeneratable fraction of the particulates in some cases passes directly into the environment without any further treatment.

In addition to a minimum reaction temperature and a specific residence time, it is necessary to provide sufficient nitrogen oxide for the continuous regeneration of particulates using $NO_2$. Tests relating to the dynamic emission of nitrogen monoxide (NO) and particulates have clearly demonstrated that the particulates are emitted in particular when there is no or only a very small amount of nitrogen monoxide in the exhaust gas, and vice versa. What that means is that a filter with true continuous regeneration substantially has to function as a compensator or storage device, so that it is ensured that the two reaction partners are present in the filter in the required quantities at a given instant. Furthermore, the filter is to be disposed as close as possible to the internal combustion engine in order to be able to reach temperatures which are as high as possible immediately after a cold start. In order to provide the required nitrogen dioxide, an oxidation catalytic converter is to be connected upstream of the filter, so as to react carbon monoxide (CO) and hydrocarbons (HC) and in particular to also convert nitrogen monoxide (NO) into nitrogen dioxide ($NO_2$). If that system including oxidation catalytic converter and filter is disposed close to the engine, a suitable position is in particular upstream of a turbocharger which is often used in diesel motor vehicles to increase the boost pressure in the combustion chamber.

If those basic considerations are looked at, the question arises, for actual deployment in automotive engineering, as to how a filter of that type, which in such a position and in the presence of extremely high thermal and dynamic loads has a satisfactory filtering efficiency, is to be constructed. In that context, account should be taken in particular of the spatial conditions, which require a new construction of filters. Whereas the maximum possible volume was to the fore in the case of conventional filters, which were disposed in the underbody of a motor vehicle, in order to ensure a long residence time of the as yet unreacted particulates in the filter and therefore a high efficiency, if the filters are disposed close to the engine, there is not sufficient space or room available.

For that purpose, a new concept has been developed, which is mainly referred to by the term "open filter system". Such open filter systems are distinguished by the fact that there is no need for the filter passages to be alternately closed off by structural measures. In that context, it is provided for the passage walls to be constructed at least in part from porous or highly porous material and for the flow passages of the open filter to have diverting or guiding structures. Those internal fittings cause the flow and the particulates contained therein to be diverted toward the regions made from porous or highly porous material. Surprisingly, it has emerged that the particulates, as a result of being intercepted and/or impacting, are retained on and/or in the porous passage wall. The pressure differences in the flow profile of the flowing exhaust gas are of importance to that effect occurring. The diversion additionally makes it possible to produce local reduced pressure or excess pressure conditions, leading to a filtration effect through the porous wall, since the above-mentioned pressure differences have to be compensated for.

The particulate trap, unlike the known closed screen or filter systems, is open, since there are no blind flow alleys. That property can therefore also be used to characterize particulate filters of that type so that, for example, the "freedom of flow" parameter is suitable for describing the systems. By way of example, a "freedom of flow" of 20% means that, when viewed in cross section, it is possible to see through approximately 20% of the surface area. In the case of a particulate filter with a passage density of approximately 600 cpsi (cells per square inch) with a hydraulic diameter of 0.8 mm, that freedom of flow would correspond to an area of over 0.1 $mm^2$.

SUMMARY OF THE INVENTION

It is accordingly an object of the invention to provide an open filter assembly, a process for producing the filter assembly and a filter body having the filter assembly, which overcome the hereinafore-mentioned disadvantages of the heretofore-known assemblies, bodies and processes of this general type and which use a filter material that is particularly suitable especially for use in the context of continuous regeneration, with the resulting demands. In this respect, the filter system has to be able to withstand the high thermal and dynamic loads in the exhaust system of a passenger automobile, which stem from the pulsed emission of very hot exhaust gas. Furthermore, the filter body is to be suitable for significantly reducing the levels of particulates in the exhaust system.

With the foregoing and other objects in view there is provided, in accordance with the invention, a filter assembly through which a fluid can flow. The filter assembly comprises at least one fiber layer made from a fiber fabric and at least one covering layer formed from at least partially porous or highly porous material. The at least one covering layer has at least one boundary region. The at least one covering layer forms a sleeve surrounding the at least one fiber layer and captively holding the at least one fiber layer inside the at least one covering layer.

In this context, a sleeve is to be understood as meaning a configuration of the at least one covering layer-in which the at least one covering layer also, at least in part, extends beyond the periphery of the fiber layer, in particular completely surrounds the fiber layer. In this respect, a sleeve is formed at least in part over the entire periphery of the fiber layer. This configuration wherein the covering layer engages around the periphery of the fiber layer accordingly means that a relative movement of the fiber layer with respect to the at least one covering layer is impeded in a form-locking manner in at least one direction. A form-locking connection is one which connects two elements together due to the shape of the elements themselves, as opposed to a force-locking connection, which locks the elements together by force external to the elements.

The construction of a filter assembly of this type combines a number of advantages which are of importance in particular for the configuration of a filter assembly of this type close to the engine. The at least one covering layer constitutes a type of protective sleeve which protects the inner fiber layer from the pressure shocks and temperature peaks which occur. The fiber layer represents a significantly looser assembly of fibers than the covering layer. In this context, it should be noted that the term "fiber fabric" encompasses all conceivable configurations of fibers in bonded composites or assemblies, knitted fabrics or the like. There are also numerous possible alternatives for the material, such as for example ceramic fibers, metal fibers, sintered materials or the like. The fiber layer may have a very high porosity, since the presence of a protective covering layer means that it does not have to be constructed primarily for strength. In particular, it is possible to realize particularly large free spaces, pores or the like in the fiber layer. This is boosted in particular by the fact that the at least one covering layer is constructed in a form similar to a strip or sheet, i.e. it offers a relatively large bearing surface area. Consequently, in this case it is possible to use fiber materials which are packed significantly more loosely than, for example, in known wire meshes which have heretofore been used to ensure the dimensional stability of the filter layers.

Sandwich structures of that type have since been constructed in such a way that in each case there is one supporting structure disposed on both sides of the filter material (in particular braided wire fabrics), and that sandwich has then been bent or deformed into the desired shape. Those sandwich structures have been disposed in the exhaust-gas stream in such a way that the periphery (or end face) of the filter material was exposed to the pulsating exhaust-gas stream without protection. That led to detachment phenomena in particular in those end regions. In order to ensure that the fiber material is fixed between the wire fabrics for a prolonged period of time, the sandwich structure had to be pressed together under a high pressure which, due to the resultant very small pores or free spaces, led to the accumulation of particulates, with noticeable adverse effects on the efficiency of the filter material. That is avoided in a simple way in the filter assembly according to the invention, since the fact that the at least one covering layer engages around the periphery of the fiber layer means that the fiber layer is disposed captively in the interior.

In accordance with another feature of the invention, the sleeve which protects the fiber layer is formed from one covering layer, the latter having at least one boundary region and an opposite deformation region. The covering layer is connected to itself by technical joining in the at least one boundary region. The preferred manner of producing the technical joining connection is by brazing. However, a sintering process or even welding may be used as well. Consequently, the dimensions of the covering layer allow the covering layer to be disposed around the fiber layer once, with the covering layer being deformed (bent, folded or the like) in the vicinity of a periphery of the fiber layer and being brazed or welded onto itself, for example on the opposite side in a boundary region. The configuration of a filter assembly of this type in the exhaust-gas stream of an internal combustion engine is preferably provided in such a way that the exhaust gas which flows onto the filter assembly strikes either the boundary region with the connection by technical joining or the deformation region. Consequently, an offset or relative movement of the fiber layer with respect to the covering layer as seen in the flow direction of the exhaust gas is not possible, since a form-locking barrier is formed in this case. In a direction perpendicular thereto, the filter assembly can make do without the covering layer engaging around it, since the forces which are active in this case are relatively low. Rather, this ensures, for example, that the different thermal expansion coefficients of covering layer and fiber layer can be compensated for.

In accordance with a further feature of the invention, as an alternative, the sleeve is formed with at least two covering layers, in which case the covering layers are connected to one another by technical joining in at least one boundary region, and the fiber layer is disposed captively between these interconnected covering layers. Accordingly, what is described herein is a sandwich structure in which the fiber layer is disposed between at least two covering layers. The sleeve is produced in this case by the externally disposed covering layers each having boundary regions which overlap the fiber layer and are connected to one another by joining (brazing, welding, sintering, adhesive bonding). These boundary regions in each case lie in the vicinity of two opposite edges of the covering layer. Even if in this context it is preferable for the boundary region with the connection by technical joining to be disposed substantially outside the region with the fiber layer, it may also be appropriate under certain circumstances for one of the two covering layers to have an elongated construction, so that it engages around a periphery of the fiber layer and is connected to the further covering layer in the region of the fiber layer. Forming a protective sleeve in this way likewise contributes to the fiber layer being disposed captively in the interior.

In accordance with an added feature of the invention, the at least one covering layer, in at least one boundary region, has a reduced porosity with respect to the remaining region, in particular has no porosity whatsoever there. This means that the covering layer has at least two different permeabilities with respect to an exhaust gas. Whereas the covering layer has a relatively high permeability or porosity in particular in the region of contact with the fiber layer, due to bores, holes, openings, apertures or the like, in the boundary region it is preferably made from a material which is substantially impervious to a fluid. This applies in particular to the additional material which is used to form the connection by technical joining, in particular brazing or welding material. This allows the covering layers which are to be connected to one another to be permanently attached even in a highly corrosive environment, as is encountered in an exhaust system.

In accordance with an additional feature of the invention, the at least one covering layer is a metal foil with a thickness of less than 0.04 mm, in particular less than 0.03 mm or even less than 0.02 mm. Making the covering layer from a metal foil has particular advantages. For example, rapid heat conduction from that surface of the covering layer which is in contact with the exhaust gas to the fiber material is possible, so that in this case too rapid regeneration of trapped and/or accumulated particulates is possible (for example after the internal combustion engine has started up). Furthermore, the proposed thickness ensures that the metal foil has only a very low surface area-specific heat capacity, so that in this case too the light-off performance and/or the rapid heating to the required minimum temperature for regeneration of soot particulates is boosted. Moreover, when selecting the specific material for a metal foil of this type, it is possible to exploit knowledge which has already been gained in connection with the development of metallic honeycomb bodies as catalyst carrier bodies disposed close to the engine.

In accordance with yet another feature of the invention, the filter assembly has a mean porosity of greater than 70%, in particular even greater than 90%. The mean porosity substantially relates to the region which is actually porous, i.e. discounting boundary regions of reduced porosity. By its very nature, the fiber layer often has a porosity which is well over 70% or 90%, and consequently a certain reduction is brought about by the covering layer which delimits the fiber layer. The porosity of the covering layer is defined, for example, by the size and/or number of the apertures, openings or the like. For example, it is conceivable for the covering layer to be provided with relatively large openings (e.g. with a diameter in the range of from 2 to 6 mm), in which case a relatively small number of openings are provided per unit area. If, for example, pressure differences across the filter assembly play only a subordinate role, it is also possible for openings of this type to be made significantly smaller (significantly less than 1 mm) but to be provided in large numbers per unit area. The particular configuration which leads to the desired porosity depends on a large number of parameters. In this context mention may be made, by way of example, of the composition of the exhaust gas (particulate size, pressure fluctuations, etc.), the fiber material used and/or the strength properties of the covering layer.

In accordance with yet a further feature of the invention, the at least one boundary region extends from an edge of the covering layer over a boundary width which amounts to between 3 mm and 15 mm, with the boundary region preferably being disposed at least at two opposite edges. This boundary width ensures that the adjacent covering layers are durably attached to one another. The given range is adapted in particular for known brazing processes or, for example, roller seam welding. In this context, it should also be noted that it is possible for the fiber material to be completely sheathed or encapsulated, in which case a brazed joint or weld seam is formed all the way around the edges of the covering layers.

In accordance with yet an added feature of the invention, as has already been mentioned above, it is particularly advantageous for the connection by technical joining to be carried out through the use of a brazing material. Brazing material has proven eminently suitable for the formation of particularly corrosion-resistant and temperature-resistant connections in the production of catalyst carrier bodies from metal foils. However, under certain circumstances it is also possible to use various known welding processes, sintering or adhesive bonding techniques.

In accordance with yet an additional feature of the invention, the fiber layer has a first length and a first width, and the at least one covering layer has a second length and a second width. The first length and/or the first width of the fiber layer is/are less than the second length and/or second width of the at least one covering layer. This means that, if the covering and fiber layers are disposed concentrically, the covering layers, at least in part, extend beyond the peripheries of the fiber layer. This leads to the formation of overlap sections which are preferably used to form the connection by technical joining (boundary region).

In accordance with again another feature of the invention, with regard to the fiber layer, it is proposed that the latter have a dimension of from 0.01 mm to 1 mm. In this context, it is preferable to use fiber layers which have an inherent porosity of over 85%. Tests carried out using fibers which have a diameter of between 0.008 mm and 0.015 mm have proven to have particularly satisfactory results with regard to the filtration action.

In accordance with again a further feature of the invention, in particular in connection with a filter assembly of this type having what is known as the open filter, to boost the flow diversion it is proposed that at least one covering layer have at least one flow-guiding surface. This is to be understood as meaning that the covering layer is not completely planar, but rather its surface forms a structure or microstructure which provides surfaces for diverting the flow. For example, a structure running transversely with respect to the direction of flow of the exhaust gas is advantageous. Under certain circumstances, a structure height of a few millimeters (less than 2 mm, in particular less than 1 mm) is sufficient. These flow-guiding surfaces contribute to having a targeted influence on the flow direction, with the result that the overall filter efficiency is improved.

With the objects of the invention in view, there is also provided a filter body for cleaning an exhaust-gas stream from an internal combustion engine. The filter body comprises a casing and at least one filter assembly as described above being at least partially disposed in the casing and forming passages, in particular corresponding to a honeycomb structure. The passages are preferably at least partially narrowed.

This means that the proposed filter assembly is suitable both for use in filter systems with alternately closed passages and for the production of open filter bodies in which it is possible to see through more than 20%, in particular more than 40%.

With regard to an open filter body, it is possible, for example, for the filter body to be constructed from corrugated sheet-metal foils and substantially smooth filter assemblies, which are first of all stacked alternately on top of one another and then coiled and/or wound together. The corrugated sheet-metal foil in this case has diverting structures which at least partially divert the exhaust gas flowing through the filter body toward the porous filter assembly. This results in the exhaust gas at least partially flowing through the filter assembly with, in particular, particulates of a size of between 20 and 200 nm being filtered out in the process. Depending on how frequently a partial stream of gas is guided through a wall of filter assembly material of this type with the aid of diverting devices of this type, an increasing filtration effect is observed as the gas flows axially through the filter body.

In accordance with another feature of the invention, at least one covering layer, at least in part, has a structure which substantially delimits the passages. In other words, the structure substantially defines the flow cross section of the passage. It is advantageous for the covering layers and/or the fiber layer together to be provided with a structure of this type, and in this context a corrugation is particularly recommended.

With the objects of the invention in view, there is additionally provided a process for producing a filter assembly through which a fluid can flow. The process comprises providing at least one covering layer having a given porosity. The at least one covering layer has at least one boundary region formed with a porosity less than the given porosity or with no porosity. At least one fiber layer made of a fiber fabric is placed on the at least one covering layer. A sleeve is formed from the at least one covering layer, surrounding the at least one fiber layer. A connection is formed by technical joining in the at least one boundary region, captively fixing the at least one fiber layer within the at least one covering layer.

The formation of a porosity in the covering layer may, for example, be generated even while the material for the covering layer is being produced. However, it is also possible for the porosity to be produced by retrospectively providing a fluid-impervious material with bores, openings, apertures or the like. In this case, it is possible in particular to use mechanical production processes (cutting, stamping, drilling or the like), etching processes or a heat treatment, in particular using a laser. All techniques which have been disclosed heretofore can be used to form the fiber layer, so that a knitted fabric, woven fabric or similar structure made from fiber-like material is formed.

In accordance with another mode of the invention, a sleeve is formed by deformation of one covering layer, in particular through the use of bending, creasing or folding of the covering layer, in a deformation region. This process step is recommended in particular for the production of a filter assembly according to the invention which has just one covering layer. In this context, with a view to the high thermal and dynamic loads on the covering layer in use, it may be advantageous if the adjacent sections of a covering layer are additionally connected to one another by joining in the deformation region. This ensures that the fiber layer is still held captively even if the covering layer should happen to tear open in the region of the bend.

In accordance with a further mode of the invention, a sleeve is formed through the use of two covering layers, in which case the at least one fiber layer is disposed between the covering layers in such a way that the boundary regions of the covering layers are at least in part directly superimposed on one another. This means that there is no fiber material disposed between the adjacent boundary regions of the covering layers, and connection by technical joining in this boundary region does not cause any damage to the fiber layer. Moreover, it is ensured that the connection by technical joining in the boundary region is able to withstand the highly corrosive conditions in the exhaust system of the internal combustion engine for a very long period of time.

In accordance with an added mode of the invention, before the fiber layer is disposed on the covering layer, a structure is introduced into at least one of the covering layers. If the filter assembly has two covering layers for forming a sleeve, it is advantageously proposed that the structure be introduced into the two covering layers successively in terms of time, and in each case a different structure be produced. By way of example, this makes it possible to form different passage densities over the cross section of the filter body, so that it is ensured that the respective cross-sectional shapes of the passages and/or passage densities are matched in a targeted manner to the incoming flow profile of the exhaust-gas stream.

In accordance with an additional mode of the invention, with regard to the configuration of the connection of the covering layers to one another by technical joining, as an alternative it is proposed that the connection by joining be carried out through the use of a welding operation or through the use of a brazing operation. These constitute particularly preferred configurations of the process. Under certain circumstances, technical joining connections using sintering or adhesive bonding processes are also possible.

In accordance with a concomitant mode of the invention, the at least one covering layer is provided with a brazing material stop outside the at least one boundary region. The brazing material stop used may be known oils, paints, waxes, ceramic slips or the like which prevent the brazing material from penetrating into internal regions of the sleeve in which the fiber layer is disposed. This firstly ensures that the brazing material does not contribute to reducing the porosity of the fiber layer and secondly also ensures that the quantity of brazing material which has been calculated to be required for the brazing material connection is actually present at the location which is to be joined.

Other features which are considered as characteristic for the invention are set forth in the appended claims.

Although the invention is illustrated and described herein as embodied in a filter assembly, a process for producing the filter assembly and a filter body having the filter assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
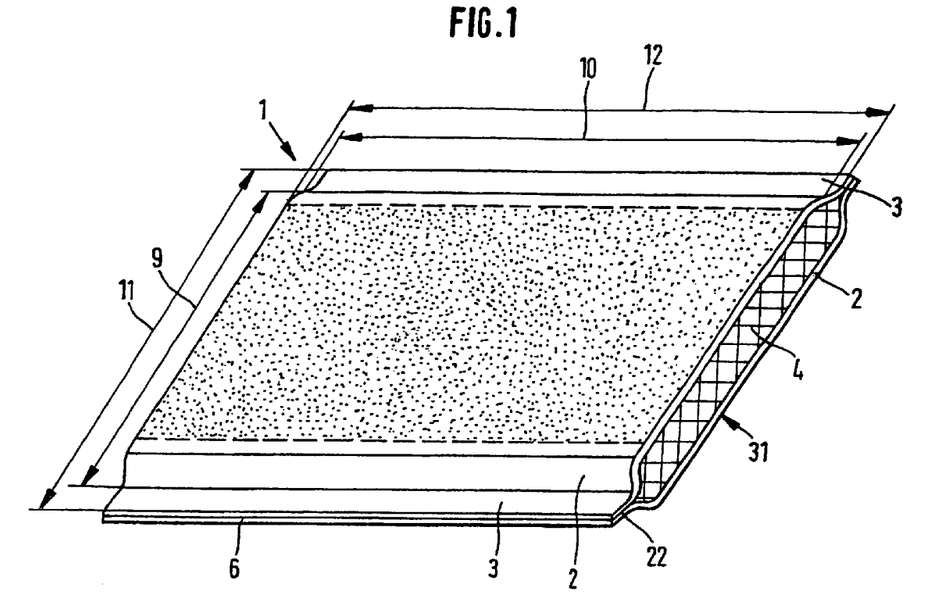
FIG. 1 is a diagrammatic, perspective view of one embodiment of the filter assembly.

Referring now to the figures of the drawings in detail and first, particularly, to FIG. 1 thereof, there is seen a diagrammatic and perspective view of an embodiment of a filter assembly 1 according to the invention with two covering layers 2. The covering layers 2 are composed at least in part of a porous material (see the dotted region) and each have two boundary regions 3 on opposite sides. Furthermore, the filter assembly 1 includes a fiber layer 4 formed from a fiber fabric. The two covering layers 2 form a sleeve 31 which surrounds the fiber layer 4, so that the fiber layer 4 is disposed captively inside the two covering layers 2. The two covering layers 2 are connected to one another by technical joining (at a connection 22). The two covering layers 2 are, in particular, brazed or welded to one another in the boundary regions 3 close to an edge 6.

The fiber layer 4 has a first length 9 and a first width 10. The covering layers 2 in each case have a second length 11 and a second width 12. In the illustrated embodiment, these are equal (equal length and equal width). In principle, the second length 11 and the second width 12 of the covering layers 2 used to form the filter assembly 1 and the sleeve 31 may also differ. The figure also shows that the covering layers 2 have a second length 11 which is greater than the first length 9 of the fiber layer 4. This means that the covering layers 2 overlap the fiber layer 4 in length, so that the boundary regions 3 can rest on top of one another. This makes it easier to form permanent connections 22.

Figure 2:
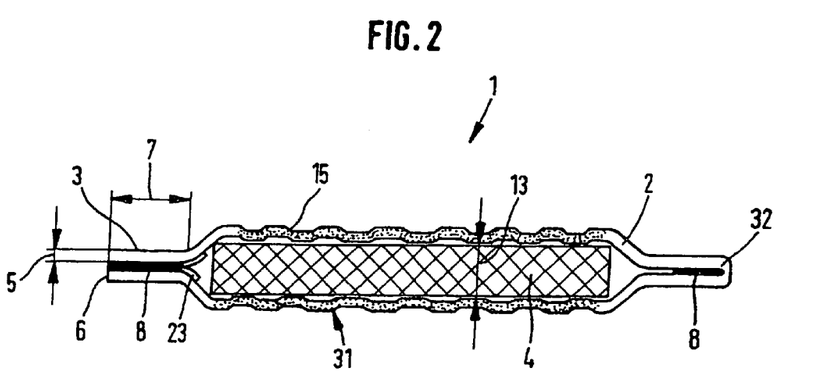
FIG. 2 is a sectional view through a further embodiment of the filter assembly.

FIG. 2 diagrammatically depicts a sectional view through a further embodiment of a filter assembly 1, the latter having just one covering layer 2 which forms the sleeve 31. The covering layer 2 has at least one boundary region 3 and an opposite deformation region 32. The covering layer 2 is connected to itself by technical joining in the boundary region 3. The connection by technical joining in this case is ensured through the use of a brazing material 8, with a brazing material stop 23 being provided outside the boundary region 3, preventing the brazing material 8 from reaching the vicinity of the fiber layer 4 during a heat treatment. In the illustrated embodiment, brazing material 8 is provided in the inside of the deformation region 32, and in this case too it is optionally possible to provide a brazing material stop 23. The boundary region 3 extends from an edge 6 of the covering layer 2 over a boundary width 7 of preferably between 3 and 15 mm.

With regard to the material thicknesses, it can be explained on the basis of FIG. 2 that the covering layer 2 is, for example, a metal foil and has a thickness 5 of less than 0.04 mm. Furthermore, it can be seen that the fiber layer 4 has a dimension 13 which is preferably in the range from 0.01 mm to 1 mm.

FIG. 2 likewise shows a covering layer 2 which is provided with flow-guiding surfaces 15. These surfaces are constructed in particular as a microstructure. In the illustrated embodiment, this microstructure or flow-guiding surfaces fulfill two functions. Firstly, the exhaust gas which flows by (from a boundary region 3 to the deformation region 32 or vice versa) is diverted or swirled up, so that partial gas streams are diverted toward or penetrate through the adjacent porous wall, in particular a filter assembly according to the invention. Furthermore, it can be seen that with a microstructure of this type it is also possible to effect a clamping action with respect to the inner fiber layer 4. This improves the stability of the filter assembly 1. Moreover, this enables the porosity of the covering layer 2 to be increased, since the clamping forces which are additionally introduced already, sufficiently prevent any possible detachment phenomena in the fiber layer 4.

Figure 3:
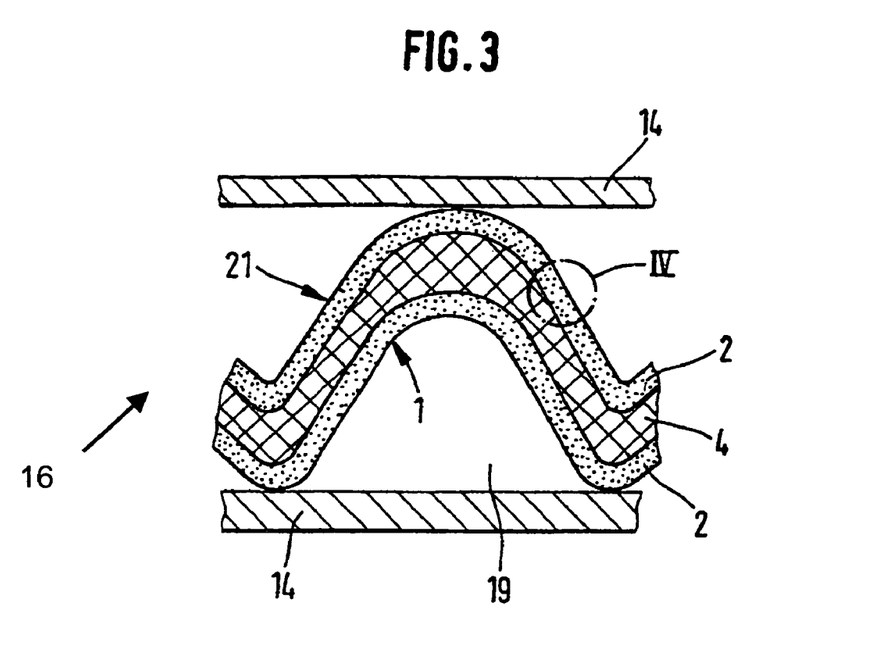
FIG. 3 is an enlarged, fragmentary, sectional view of a portion of an embodiment of the filter body according to the invention.

FIG. 3 diagrammatically depicts a fragmentary view of an embodiment of a filter body 16 according to the invention. The filter body 16 is constructed from partitions 14, between which at least one filter assembly 1 is disposed. The filter assembly 1, like the partitions 14, is illustrated in section, with the two covering layers 2 once again forming a non-illustrated sleeve 31 around the fiber layer 4. In the illustrated embodiment, the filter assembly 1 has a structure 21 which substantially performs the function of spacing the smooth partitions 14 apart from one another and forming passages 19. The passages 19 have a cross-sectional area which is substantially defined by this structure 21 of the filter assembly 1.

Figure 4:
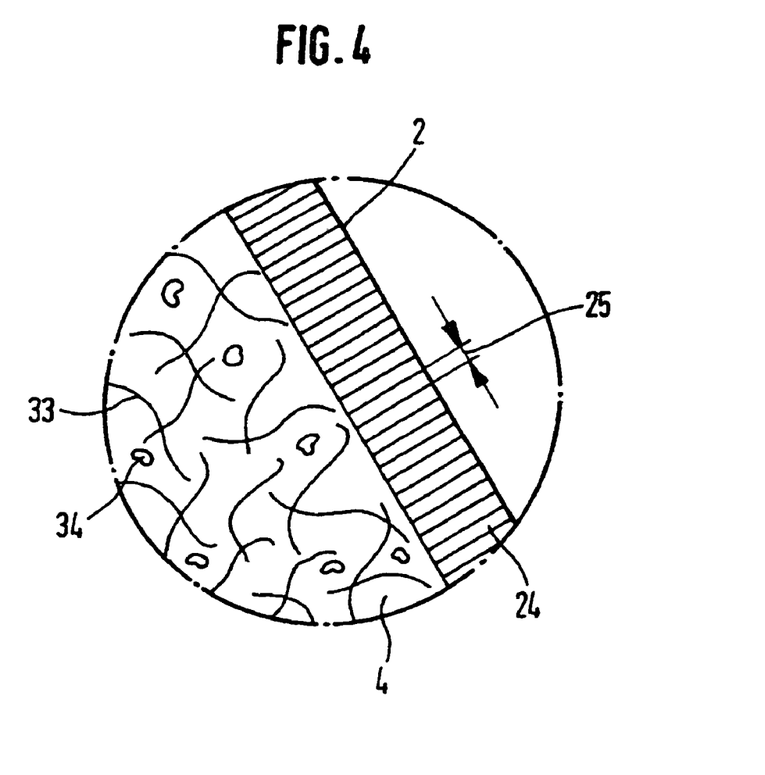
FIG. 4 is an enlarged view of a portion IV of FIG. 3.

FIG. 4 shows a highly simplified, enlarged fragmentary view of a portion of FIG. 3 which is indicated by reference numeral IV. The fiber layer 4 is delimited by a covering layer 2. The covering layer 2 has a multiplicity of openings 24 with an opening diameter 25. The opening diameter 25 varies considerably depending on the particular application and is preferably in the range between 2 and 6 mm. However, under certain circumstances it is also conceivable for openings of this type to be constructed with diameters of less than 1 mm or even 0.1 mm. As is likewise illustrated in highly simplified form, the fiber layer 4 includes a large number of fibers 33, which are disposed so as to form a knitted fabric, a woven fabric or the like. Alternatively, they may also be metal fibers, sintered materials or wire fabrics. In the illustrated embodiment, additional elements or constituents, in particular catalysts 34, are integrated in the fiber layer 4, assisting the regeneration of accumulated soot particulates or the like even at low temperatures (for example between 200 and 300° C.).

Figure 5:
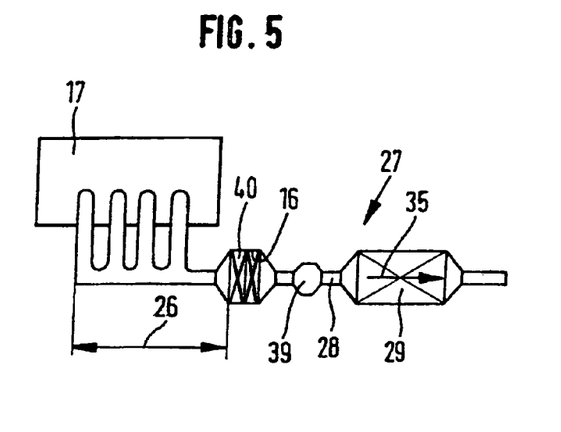
FIG. 5 is an elevational view of an exhaust system.

FIG. 5 diagrammatically depicts the structure of an exhaust system 27 for an internal combustion engine 17. An internal combustion engine 17 of this type is preferably constructed as a diesel engine. As is seen in a flow direction 35 of the exhaust gas, the exhaust system 27 includes the following components:

an upstream oxidation catalytic converter 40;
a filter body 16 according to the invention;
a turbocharger 39; and
a further catalytic converter 29.

The individual components may be disposed in separate casings or may be partially combined with one another in a single casing, and are connected to one another through an exhaust pipe 28. As has already been stated in the introduction, it is particularly advantageous for the filter body 16 to be disposed as close as possible to the internal combustion engine 17. A distance 26 between the filter body 16 and the internal combustion engine 17 of less than 0.7 m, in particular even less than 30 cm, is particularly suitable in this respect. Due to the individual components being disposed in this way, first of all a sufficient quantity of nitrogen dioxide is made available with the aid of the oxidation catalytic converter 40, ensuring. (continuous) regeneration of the accumulated soot particulates in the filter body 16 disposed immediately downstream. The downstream catalytic converter 29 may, for example, also be constructed as a hybrid converter, in which case it has partial regions with different heat capacities. In this context, it is to be constructed in such a way that its heat capacity increases in the flow direction.

Figure 6:
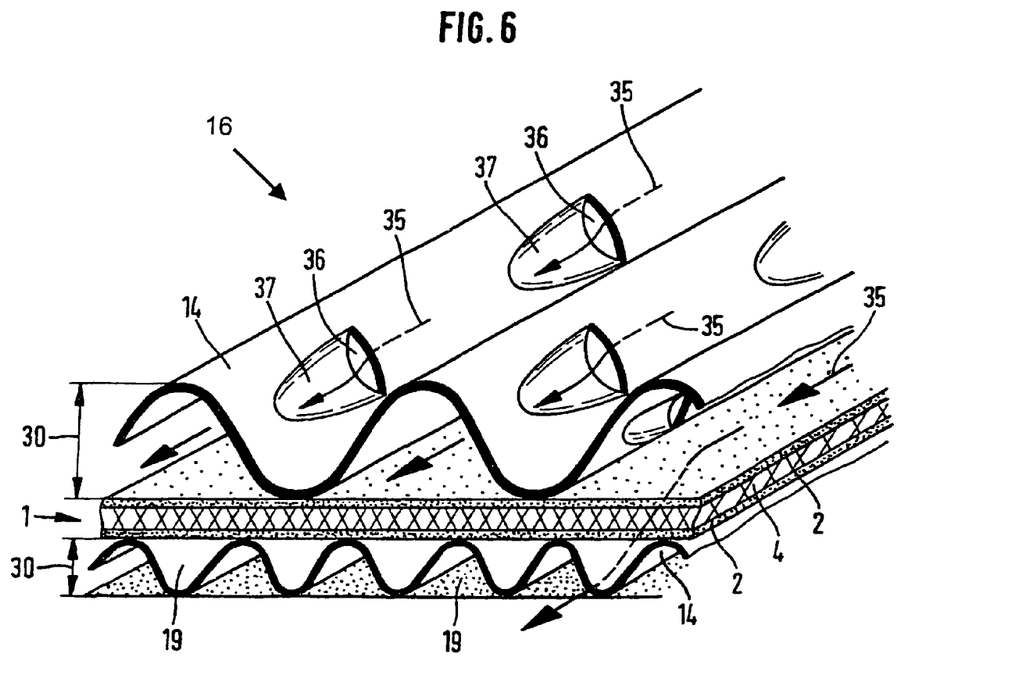
FIG. 6 is an enlarged, fragmentary, perspective view of a portion of a further embodiment of the filter body.

FIG. 6 shows a diagrammatic and perspective illustration of a further embodiment of the filter body 16 according to the invention. The filter body 16 in this case once again includes partitions 14, between which a filter assembly 1 according to the invention is disposed in each case. In the illustrated embodiment, the filter assembly 1 is formed with two covering layers 2 and a fiber layer 4 disposed therebetween, although the connection by technical joining in the boundary region cannot be seen due to the sectional illustration. The partitions 14 in this case are provided with a structure, whereas the filter assembly 1 has a substantially smooth surface. This structure of the partitions 14 forms passages 19 through which an exhaust gas can flow in the flow direction 35. The partitions 14, in this case have different heights 30 of the structure, so that the passages 19 which are formed are matched to the characteristics of the incoming flow of exhaust gas.

The embodiment illustrated herein substantially shows an open filter. This property is described by the fact that there is a freedom of flow of at least 20%. In this context, the term freedom of flow means that in any desired cross section it is possible to see through at least 20% of the area, i.e. at least 20% of the area is free of internal fittings, such as diverting surfaces 37 or the like. In other words, this also means that when a particulate filter of this type is viewed from the end side, it is possible to see through at least some of the passage, provided that the internal fittings are all in the same position, i.e. are aligned one behind the other. This is typically the case with honeycomb bodies made from at least partially structured sheet-metal layers. However, the freedom of flow, in the case of internal fittings which are not aligned with one another, does not necessarily mean that it is actually possible to see through part of a honeycomb body of this type. The partitions 14 are provided with apertures 36 and the diverting surfaces 37 which divert the exhaust-gas stream toward the filter assembly 1. This produces pressure differences which cause partial flows of exhaust gas to penetrate through the filter assembly 1, so that soot particulates or the like remain and accumulate in the fiber layer 4.

Figure 7:
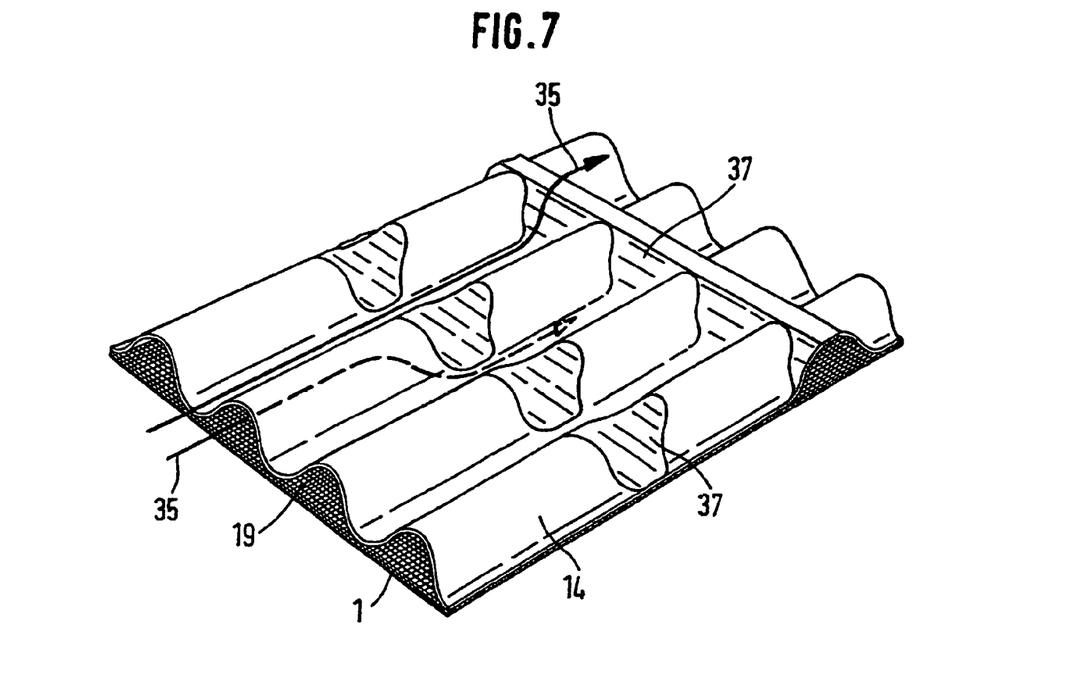
FIG. 7 is a perspective view of a further configuration of the filter body.

FIG. 7 shows a slightly different configuration of a filter body according to the invention. In this case too, the passages 19 are substantially generated by a corresponding structure of the partitions 14. Furthermore, the partitions 14 have diverting surfaces 37, which in the illustrated case close off the entire cross section of the passages 19. The result of this is that the flow direction 35 of the exhaust gas is influenced in such a manner that the particulate-containing exhaust gas is guided through the filter assembly 1. This configuration is mainly suitable for applications in which a pressure loss is not critical. In the case of mobile exhaust systems, according to current knowledge, it is preferable to use an open filter with passages 19 which are just constricted but are not closed off. Depending on the number of diverting surfaces 37 which the exhaust gas is to pass through and/or the flow through a filter assembly 1, ultimately substantially the entire exhaust-gas stream is filtered and purified even in the case of an open filter body 16, as illustrated in FIG. 6.

Figure 8:
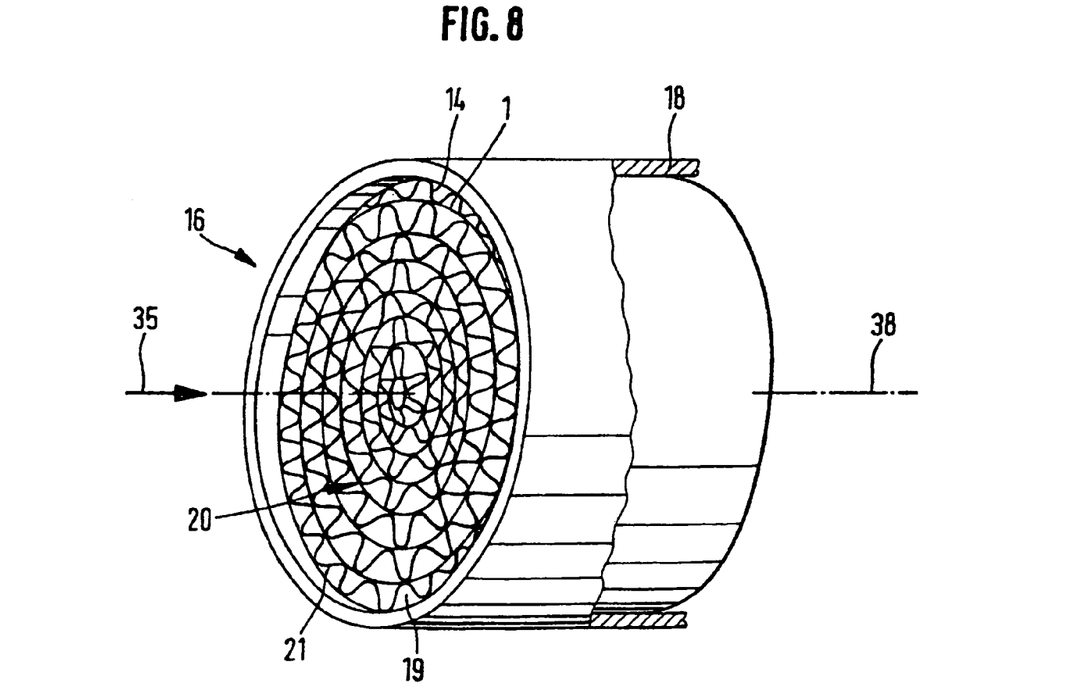
FIG. 8 is a fragmentary, partly broken-away perspective view of a further embodiment of the filter body according to the invention.

FIG. 8 shows a diagrammatic and perspective illustration of a configuration of the filter body 16 having a filter assembly 1 and a partition 14, which are wound helically to form a honeycomb body and are disposed in a casing 18. The partition 14 has a structure 21, so that passages 19, through which the exhaust gas can flow in the flow direction 35, are formed. The exhaust gas enters the filter body 16 through an end side 20 and, due to the flow diversions in the interior of an open filter, adopts a flow path which is preferably longer than the extent of the passages 19 in the direction of an axis 38.

The filter assembly described herein and the filter body which it is used to construct are particularly suitable for installation close to the engine in mobile exhaust systems. The proposed filter assembly is able to permanently withstand the high pressure loads which occur there due to the proximity to the combustion chamber and the high temperatures of up to 700° C., and from time to time even up to 1000° C., since the fiber layer is at least partially surrounded, in a form-locking manner, by a protective sleeve formed by at least one covering layer. This prevents the fiber layer from exhibiting detachment phenomena after even just a short time. The proposed process is very simple and can be carried out reliably and without major technical difficulties even in large-series production, as is customary for automotive engineering.

I claim:

1. A filter assembly through which a fluid can flow, the filter assembly comprising:
at least one fiber layer made from a fiber fabric; and
at least one covering layer formed from at least partially porous material, said at least one covering layer having at least one boundary region, and said at least one covering layer forming a sleeve surrounding said at least one fiber layer and captively holding said at least one fiber layer inside said at least one covering layer;
said fiber layer and said covering layer being resistant to temperatures of over 200° C.

2. The filter assembly according to claim 1, wherein said at least one covering layer forming said sleeve is one covering layer having said at least one boundary region and an opposite deformation region, said covering layer being connected to itself by technical joining in said at least one boundary region.

3. The filter assembly according to claim 1, wherein said at least one covering layer is at least two covering layers forming said sleeve, said at least two covering layers being connected to one another by technical joining in said at least one boundary region, and said at least one fiber layer being disposed captively between said at least two interconnected covering layers.

4. The filter assembly according to claim 1, wherein said at least one covering layer has a reduced porosity in said at least one boundary region, relative to a remaining region.

5. The filter assembly according to claim 1, wherein said at least one covering layer has no porosity in said at least one boundary region, relative to a remaining region.

6. The filter assembly according to claim 1, wherein said at least one covering layer is a metal foil with a thickness of less than 0.04 mm.

7. The filter assembly according to claim 1, wherein said at least one covering layer is a metal foil with a thickness of less than 0.03 mm.

8. The filter assembly according to claim 1, wherein said at least one covering layer is a metal foil with a thickness of less than 0.02 mm.

9. The filter assembly according to claim 1, wherein said at least one covering layer and said at least one fiber layer together have a mean porosity of greater than 70%.

10. The filter assembly according to claim 1, wherein said at least one covering layer and said at least one fiber layer together have a mean porosity of greater than 90%.

11. The filter assembly according to claim 2, wherein said at least one covering layer has an edge, and said at least one boundary region extends from said edge over a boundary width of between 3 mm and 15 mm.

12. The filter assembly according to claim 2, wherein said at least one covering layer has at least at two opposite edges, and said at least one boundary region extends from said at least two opposite edges over boundary widths of between 3 mm and 15 mm.

13. The filter assembly according to claim 3, wherein said at least one covering layer has an edge, and said at least one boundary region extends from said edge over a boundary width of between 3 mm and 15 mm.

14. The filter assembly according to claim 3, wherein said at least one covering layer has at least at two opposite edges, and said at least one boundary region extends from said at least two opposite edges over boundary widths of between 3 mm and 15 mm.

15. The filter assembly according to claim 2, wherein said connection of said covering layer by technical joining is a brazed connection.

16. The filter assembly according to claim 3, wherein said connection of said at least two covering layers by technical joining is a brazed connection.

17. The filter assembly according to claim 1, wherein said at least one fiber layer has a first length and a first width, said at least one covering layer has a second length and a second width, and at least one of said first length and said first width being less than at least one of said second length and said second width.

18. The filter assembly according to claim 1, wherein said at least one fiber layer has a dimension of from 0.01 mm to 1 mm.

19. The filter assembly according to claim 1, wherein said at least one covering layer has at least one flow-guiding surface.

20. A filter body for cleaning an exhaust-gas stream from an internal combustion engine, the filter body comprising:
a casing; and
at least one filter assembly according to claim 1 at least partially disposed in said casing and forming passages.

21. The filter body according to claim 20, wherein said at least one filter assembly corresponds to a honeycomb structure having said passages.

22. The filter body according to claim 20, wherein said passages are at least partially narrowed.

23. The filter body according to claim 20, wherein said at least one covering layer at least in part has a structure substantially delimiting said passages.

24. A process for producing a filter assembly through which a fluid can flow, the process comprising the following steps:
providing at least one covering layer formed with a given porosity and a resistance to temperatures of over 200° C., the at least one covering layer having at least one boundary region formed with a porosity less than the given porosity;
placing at least one fiber layer made of a fiber fabric having a resistance to temperatures of over 200° C. on the at least one covering layer;
forming a sleeve with the at least one covering layer surrounding the at least one fiber layer; and
forming a connection by technical joining in the at least one boundary region, captively fixing the at least one fiber layer within the at least one covering layer.

25. The process according to claim 24, wherein the at least one boundary region is non-porous.

26. The process according to claim 24, which further comprises carrying out the step of forming the sleeve by deforming the at least one covering layer.

27. The process according to claim 26, which further comprises carrying out the step of deforming the at least one covering layer by a deforming method selected from the group consisting of bending, creasing and folding the at least one covering layer in a deformation region.

28. The process according to claim 24, which further comprises carrying out the step of forming the sleeve by placing the at least one fiber layer between two covering layers, with the boundary regions of the covering layers being at least partly directly superimposed on one another.

29. The process according to claim 24, which further comprises introducing a structure into the at least one covering layer before the step of placing the at least one fiber layer on the at least one covering layer.

30. The process according to claim 24, which further comprises carrying out the step of forming the sleeve by using two covering layers, and successively introducing a structure into the two covering layers over time, each producing a different structure.

31. The process according to claim 24, which further comprises carrying out the step of forming the connection by technical joining through the use of a welding operation.

32. The process according to claim 24, which further comprises carrying out the step of forming the connection by technical joining through the use of a brazing operation.

33. The process according to claim 24, which further comprises providing the at least one covering layer with a brazing material stop outside the at least one boundary region.

* * * * *